H. Ogborn.
Stovepipe Damper.
Nº 71524. Patented Nov. 26, 1867.
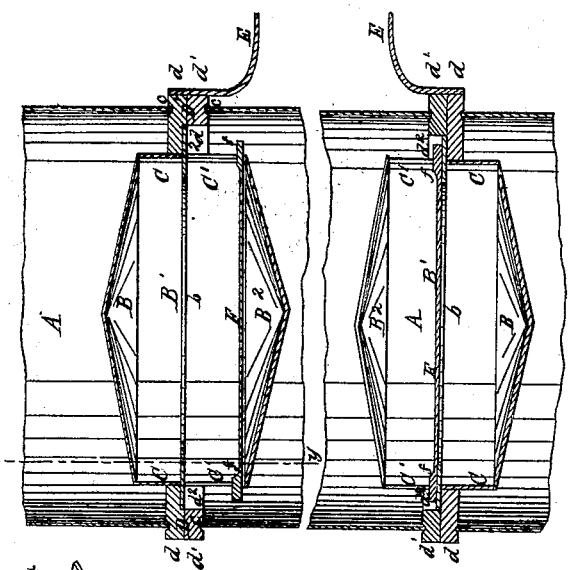
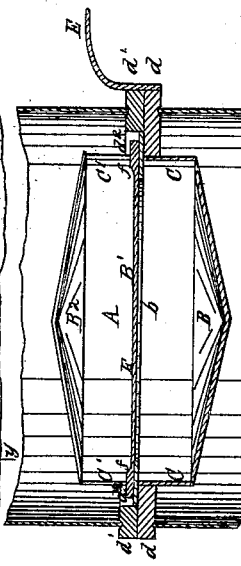
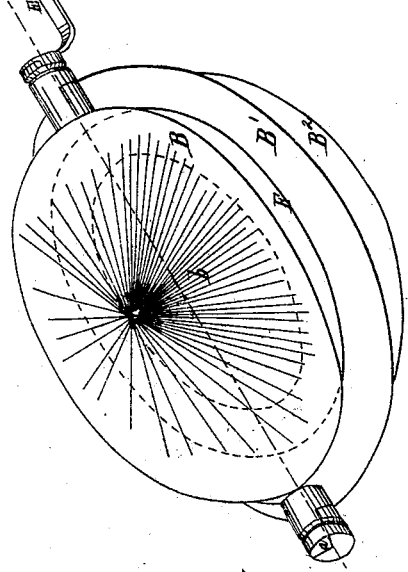
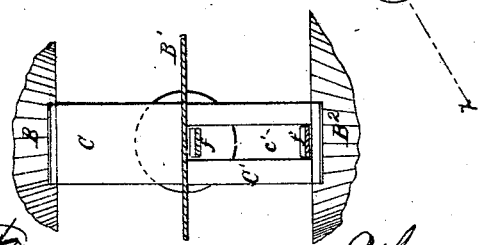
Witnesses.
Henry J. ———
Geo. W. Wood
Inventor.
Harrison Ogborn

United States Patent Office.

HARRISON OGBORN, OF RICHMOND, INDIANA.

Letters Patent No. 71,524, dated November 26, 1867.

---

IMPROVEMENT IN STOVE-PIPE DAMPERS.

---

The Schedule referred to in these Letters Patent and making part of the same.

---

TO ALL WHOM IT MAY CONCERN:

Be it known that I, HARRISON OGBORN, of Richmond, in the county of Wayne, and State of Indiana, have invented a new and useful Improvement in Stove-Pipe Dampers; and I do hereby declare the following to be a full and correct description of the same, sufficient to enable others skilled in the art to which my invention appertains to understand and use the same, reference being had to the accompanying drawings, making part of this specification, in which—

Figure 1 is a perspective view of my improved damper.

Figures 2 and 3 are longitudinal vertical sections in the line $x\,x$, fig. 1, showing two different positions of the same; and Figure 4 is a transverse vertical section of the same, in the line $y\,y$, fig. 2.

Similar letters indicate corresponding parts in the several figures.

The nature of my invention consists in placing between two of the plates of a revolving three-plate stove-pipe damper a fourth sliding plate, in such a manner that the damper may either fully close the draught, leaving only sufficient space around its edges to allow the products of the combustion and gases to pass without creating a draught, or dampen the draught sufficiently to prevent a too rapid consumption of the fuel, and consequent waste of heat, or that, on starting a fire, a fuel-draught may be opened.

A, in the drawings, represents the stove-pipe, and B, $B^1$, $B^2$, the three plates of the damper, attached to the two cross-pieces or plates C C'. The centre plate $B^1$ is of a larger diameter than the two other plates B and $B^2$, and is provided with an opening, as shown at $b$, figs. 1, 2, and 3. The two bearings D D' of the damper are made in two pieces $d\,d'$, provided at their ends with V-shaped recesses and projections, as shown at $a$, fig. 1, to keep them firmly connected. At the point where they pass through the stove-pipe, they are provided with grooves $c$, which are grasped by corresponding exsections in the two pieces of stove-pipe at a joint, so that the bearings cannot move laterally, but are free to rotate when operated by the handle E, the grooves $c$ being sufficiently sharp to enable the weight of the stove-pipe to prevent its turning otherwise. The cross-plates C C' are attached to the inner ends of the bearings D D', and the centre plate $B^1$ is attached to the pieces $d$. The parts $d^1$ of the bearings are provided with slots $d^2$, corresponding with slots $c'$ in the pieces C', and which are the bearings for the square end pieces $f$ of the circular sliding plate F, which covers the opening $b$, in the centre plate $B^1$. These end pieces $f$ are made thick, and with rounded edges, so as to freely slide in the slots $c'$, in the pieces C', and slots $d$, parts $d^1$, of the bearings D D'. The plates B and $B^2$ are made of a conical form, so as to deflect the ascending heat from the centre, and radiate it on to the stove-pipe, thereby making the latter act as a radiator or drum.

When starting a fire, a strong draught is required to kindle the fuel. For this purpose the damper is turned, so that all the plates are in a vertical position, opposing no hindrance to the draught. As soon as the fire is well under way, the damper is turned into a position as shown in fig. 2. The heat and products of the combustion pass around the plate $B^2$, through plate $B^1$, around the plate B, and out into the chimney, the plate F gliding down in the slots $d^2$ of parts $d^1$, and the slots $c'$, in plates C', until it rests on the plate $B^2$.

In the evening, to keep the fire in over night, or whenever it is desirable, the damper is turned into the position shown in fig. 3. The plate F has now slid in its bearings on to the plate $B^1$, covering the hole $b$ of the same up entirely. The draught being shut off, by this means the gases and other products of combustion are now obliged to pass off around the edges of the plate $B^1$, its hole $b$ being closed by the plate F.

Having thus described my invention, what I claim as new therein, and desire to secure by Letters Patent, is—

1. The plate F, provided with end pieces $f$, sliding in the slots $c'$ and $d^2$, substantially as described.
2. The slots $c'$, in the cross-plates C', substantially as and for the purposes described.
3. The slots $d^2$, in the parts $d^1$ of the bearings D D', substantially as and for the purposes described.
4. The combination of the plate F, provided with end pieces $f$, the cross-plates C', provided with slots $c'$ and bearings D D', the parts $d^1$ of which have slots $d^2$, substantially as and for the purposes described.
5. The combination of the cone-shaped plates B and $B^2$, circular plate $B^1$, provided with an opening, $b$, sliding plate F, with end pieces $f$, cross-plates $c\,c'$, the latter provided with slots $c'$ and bearings D D', with grooves $c$, and consisting of parts $d\,d^1$, the latter having slots $d^2$, substantially as and for the purposes described.

The above specification of my improvement in stove-pipe dampers, signed this 28th day of February, 1867.

HARRISON OGBORN.

Witnesses:
    EDM. F. BROWN,
    GEO. W. WOOD.